United States Patent
Szafraniec et al.

(10) Patent No.: US 6,914,681 B2
(45) Date of Patent: Jul. 5, 2005

(54) INTERFEROMETRIC OPTICAL COMPONENT ANALYZER BASED ON ORTHOGONAL FILTERS

(75) Inventors: Bogdan Szafraniec, Sunnyvale, CA (US); Gregory D. Vanwiggeren, Los Gatos, CA (US); Ali Motamedi, Los Altos, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 617 days.

(21) Appl. No.: 09/938,100

(22) Filed: Aug. 22, 2001

(65) Prior Publication Data

US 2003/0053068 A1 Mar. 20, 2003

(51) Int. Cl.[7] ................................................. G01B 9/02
(52) U.S. Cl. ..................................... 356/477; 356/73.1
(58) Field of Search ............................... 356/477, 479, 356/454, 484, 487, 481, 73.1

(56) References Cited

U.S. PATENT DOCUMENTS

| | | | | |
|---|---|---|---|---|
| 4,856,899 A | * | 8/1989 | Iwaoka et al. | 356/454 |
| 4,905,244 A | * | 2/1990 | Wyeth et al. | 372/32 |
| 5,202,745 A | * | 4/1993 | Sorin et al. | 356/73.1 |
| 5,390,017 A | * | 2/1995 | Ozeki et al. | 356/73.1 |
| 5,502,562 A | | 3/1996 | Werle | |
| 5,780,843 A | * | 7/1998 | Cliche et al. | 250/226 |
| 5,801,830 A | * | 9/1998 | Seago et al. | 356/454 |
| 5,852,496 A | * | 12/1998 | Gisin et al. | 356/477 |
| 6,204,924 B1 | * | 3/2001 | Cyr | 356/453 |
| 6,434,176 B1 | * | 8/2002 | Deck | 372/32 |
| 6,486,961 B1 | * | 11/2002 | Szafraniec et al. | 356/477 |
| 6,606,158 B2 | * | 8/2003 | Rosenfeldt et al. | 356/477 |

OTHER PUBLICATIONS

Glombitza, U. et al. "Coherent Frequency–Domain Reflectometry for Characterization of Single–Mode Integrated–Optical Waveguides", Journal of Lightwave Technology, vol. 11, No. 8, Aug. 1993, pp. 1377–1384.

Dyer, S. D. et al., "Low–Coherence Interfereometric Measurements of Fibre Bragg Grating Dispersion", Electronics Letters, Aug. 19, 1999, vol. 35, No. 17, pp. 1485–1486.

* cited by examiner

Primary Examiner—Gregory J. Toatley, Jr.
Assistant Examiner—Andrew H. Lee

(57) ABSTRACT

A system and method for measuring optical characteristics of an optical device under test (DUT) is provided. The system includes a light source for generating an optical signal applied to the optical DUT. A reference interferometer and a test interferometer are optically coupled to the light source. A computing unit is coupled to the interferometers, and utilizes amplitude and phase computing components, such as orthogonal filters, in determining optical characteristics of the optical DUT.

27 Claims, 8 Drawing Sheets

INTERFEROMETRIC OPTICAL COMPONENT ANALYZER BASED ON ORTHOGONAL FILTERS

BACKGROUND OF THE INVENTION

1. Field of the Invention

The principles of the present invention relate generally to the field of optical network analysis, and more particularly, to a system and method for determining the optical characteristics of an optical component under test.

2. Description of Related Art

An optical network analyzer is a vital tool for determining optical characteristics of optical components, such as fiber Bragg gratings. The optical characteristics determined by an optical network analyzer may include reflectance and transmittance of a particular two port or multiport optical component under test. The optical characteristics (e.g., reflection or transmission) of an optical component under test are described by a transfer function and are typically determined by measuring the amplitude and phase of optical signals that have been reflected by or transmitted through the component. The phase response characteristics of an optical component under test are often described by group delay or dispersion.

Most conventional group delay measurement techniques were developed for optical network analyzers that utilize non-continuously tunable laser sources. A non-continuously tunable laser source is a laser source that can be tuned across a predefined range of frequencies in discrete frequency steps. A typical technique to measure amplitude, phase, and group delay is to apply an electrical stimulus in the form of intensity or phase modulation to an optical signal, and then measure the electrical response of the transmitted or reflected optical signals using a well known phase sensitive electrical detection device, e.g., a lock-in amplifier or an electrical network analyzer. A concern with this technique is that the group delay measurement is indirect and limits the accuracy of the measurement. In addition, the technique requires a long measurement time to obtain an accurate result. Consequently, a long-term stability of the test setup is required to effectively utilize the technique.

However, continuously tunable laser sources have recently become available. A continuously tunable laser source can continuously sweep a predefined range of frequencies without frequency jumps or mode hops. The availability of continuously tunable laser sources has allowed for development of interferometric methods for measuring the optical characteristics of optical components. The interferometric methods are based on direct measurements of phase differences between interfering optical signals. Typically, Fourier analysis of a heterodyne beat frequency directly related to the sweeping optical frequency of a continuously tunable laser source is used to measure the optical characteristics, including the group delay. A concern with the interferometric methods using Fourier analysis is that the frequency sweep of a continuously tunable laser source is non-uniform. The non-uniformity of the frequency sweep causes a similar non-uniformity in the resulting beat frequency that introduces an uncertainty in the calculation of the optical characteristics by means of the Fourier analysis. What is needed is a technique to determine the optical characteristics of the continuously tunable laser with minimal uncertainty.

SUMMARY OF THE INVENTION

The principles of the present invention determine optical characteristics of an optical component. To overcome the problem of using tunable laser sources having non-uniform frequency sweeps to measure optical characteristics of optical components, an optical network analyzer or test system that utilizes amplitude and phase computing components, such as orthogonal filters, to compute the optical characteristics of an optical device under test (DUT) may be employed. The optical characteristics may include amplitude, phase, and group delay. The optical network analyzer may include an interferometer to measure the optical DUT, and a processor that processes the measured optical signals utilizing the orthogonal filters. The orthogonal filters include an in-phase and a quadrature filter. A reference interferometer may further be included to measure optical frequency and/or amplitude of the tunable laser. Amplitude and phase are computed from heterodyne beat signals produced by the interferometers, and group delay is computed based on the computed phase.

One embodiment includes a system and method for measuring optical characteristics of an optical device under test (DUT). The system includes a light source for generating an optical signal applied to the optical DUT. A reference interferometer and a test interferometer are optically coupled to the light source. A computing unit is coupled to the interferometers, and utilizes the orthogonal filters in determining optical characteristics of the optical DUT. The optical characteristics may include a reflective transfer function, a transmissive transfer function, and group delay. By utilizing the principles of the present invention, uncertainty in computing the optical characteristics of the optical DUT may be minimized.

BRIEF DESCRIPTION OF THE DRAWINGS

FIG. 16B depicts a Hilbert transform;

DETAILED DESCRIPTION OF THE EXEMPLARY EMBODIMENTS OF THE INVENTION

Tunable laser sources as presently available frequency sweep in a non-uniform manner. A heterodyne beat signal having a beat frequency produced by an interferometer for measuring optical components is affected by the sweep non-uniformity of the tunable laser source. Typical variations of the heterodyne beat signal due to the sweep non-uniformity are substantially larger than those induced by the measured dispersion of the optical component. In characterizing optical components, typical optical measurement systems or optical network analyzers include two interferometers, a non-dispersive reference interferometer and a test interferometer that includes the optical component or device under test (DUT) being measured. The reference interferometer is used for measuring the non-uniform sweep of the tunable laser source, where the measurement of the non-uniform sweep is utilized for compensation of the measurement from the test interferometer. Heterodyne beat signals from both interferometers may vary in frequency, phase, and amplitude. The precision of the amplitude and phase detection of the beat signals from the interferometers determines the accuracy of characterization of the optical component.

In computing optical characteristics of the optical component, the heterodyne beat signals from the interferometers are utilized to compute optical frequency of the tunable laser source and a reflection or transmission transfer function, including amplitude and phase, of the optical DUT. In determining the amplitude and phase characteristics of the heterodyne beat signal, orthogonal filters may be utilized. The orthogonal filters are formed by in-phase and quadrature filters or other acceptable orthogonal filters in the time and/or frequency domain. Reflection or transmission transfer functions and group delay of the optical component may be determined from the amplitude and phase of the heterodyne beat signals. The reflection or transmission characteristics may be determined using various computational methods, including subtraction, division, and clocking.

Figure 1:
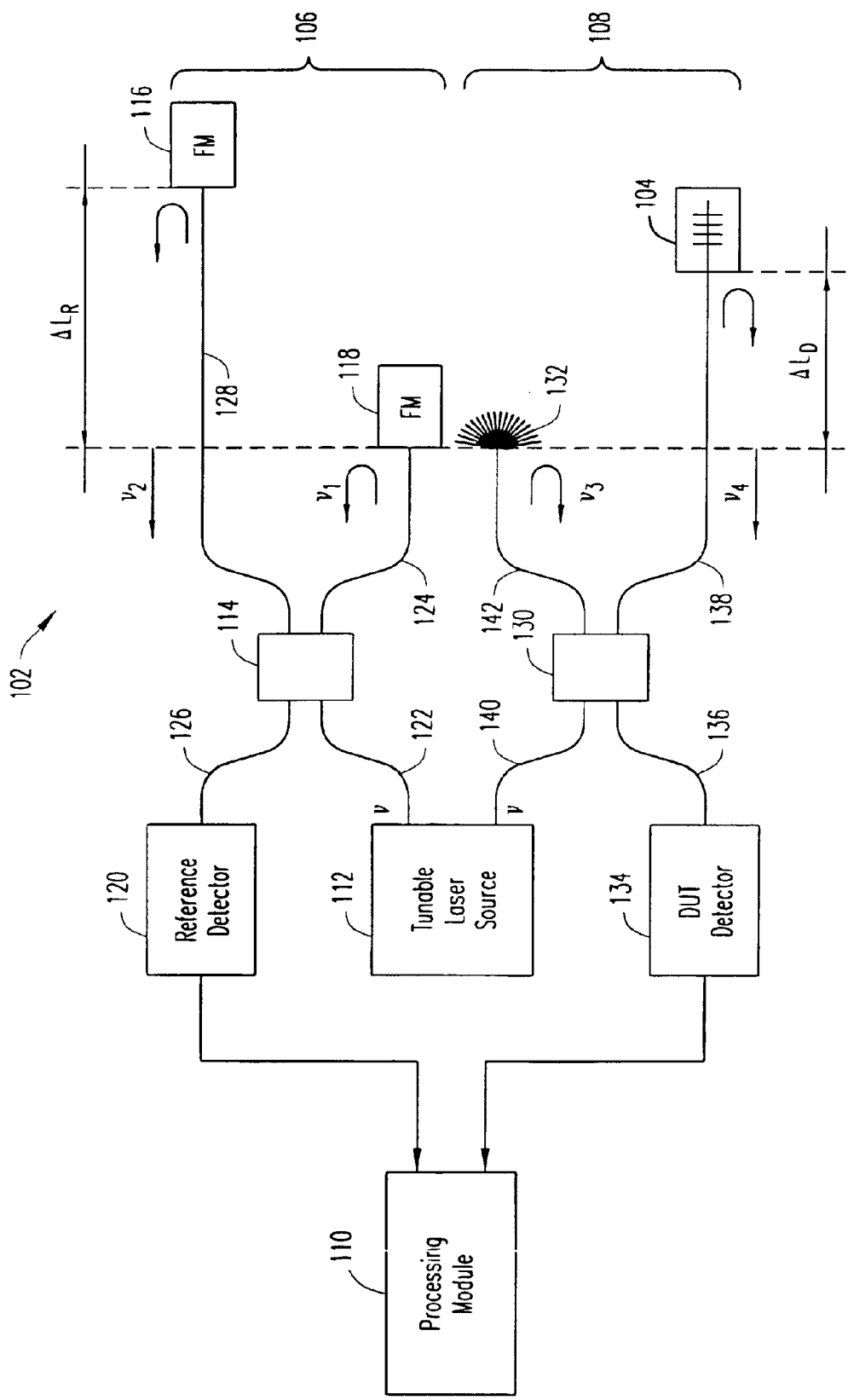
FIG. 1 is a block diagram of an optical network analyzer configured to perform reflectance measurement in accordance with the principles of the present invention.

With reference to FIG. 1, an optical network analyzer 102 in accordance with the present invention is shown. The analyzer measures optical characteristics of the optical device under test 104. In particular, the analyzer determines the amplitude of the reflection transfer function and the group delay of the optical DUT 104. As an example, the optical DUT may be a fiber Bragg grating, although the optical DUT may be any optical component. The optical network analyzer computes the amplitude and phase of the transfer function of the optical DUT in an efficient manner using an interferometric method based on orthogonal filters of AC coupled heterodyne beat signals. The group delay is determined from the phase response.

The optical network analyzer 102 includes a reference interferometer 106, a test interferometer 108, and a processing unit 110. As illustrated in FIG. 1, the reference and test interferometers 106 and 108 are configured as Michelson interferometers to measure the reflective characteristics of the optical DUT 104. However, other types of interferometers could instead be used. For example, the interferometers 106 and 108 may be configured as Mach-Zehnder interferometers to measure the transmissive characteristics of the optical DUT 104. Alternatively, rather than using a reference interferometer, an optical or electronic counter as known in the art may be utilized to detect the phase of the continuously tunable laser source. The reference and the test interferometers 106 and 108 both utilize a continuously tunable laser source 112. The continuously tunable laser source 112 is configured to generate an optical signal having a frequency that continuously sweeps across a predefined range of frequencies in a non-uniform manner. That is, the rate of change in frequency of the optical signal generated by the tunable laser source varies with time as the predefined range of frequencies is swept.

As explained in detail below, the transfer function of the optical DUT 104 is computed by measuring the amplitude and the phase changes of an AC coupled heterodyne beat signal from the test interferometer 108 caused by the optical DUT 104. The heterodyne beat signal is produced from an input optical signal generated by the continuously tunable laser source 112. However, due to the frequency sweep non-uniformity of the laser source, the optical frequency changes of the input optical signal are non-uniform. The non-uniformity introduces undesired frequency/phase changes into the heterodyne beat signal. The reference interferometer 106 and the processing unit 110 form an optical frequency counter that measures the undesired phase changes caused by the non-uniform optical frequency sweep of the input optical signal. Alternative optical frequency counters as known in the art may be utilized. The reference interferometer 106 produces a reference heterodyne beat signal that includes the phase changes caused by the frequency sweep non-uniformity of the tunable laser source. Additionally, the reference heterodyne beat signal may include amplitude caused by the tunable laser source. The reference heterodyne beat signal is then detected to measure the undesired phase changes. Since the measured phase changes are common to both interferometers 106 and 108, the distortions due to the non-uniform frequency sweep can be removed from the heterodyne beat signal produced by the test interferometer 108 using the reference heterodyne beat signal from the reference interferometer 106.

The reference interferometer 106 of the optical network analyzer 102 includes the continuously tunable laser source 112, an optical coupler 114, Faraday mirrors 116 and 118, and a reference detector 120. These components of the reference interferometer 106 are connected to each other by optical fibers 122, 124, 126, and 128. The optical fiber 122 connects the tunable laser source to the optical coupler 114, while the optical fiber 126 connects the reference detector 120 to the optical coupler 114. Similarly, the optical fiber 124 connects the optical coupler 114 to the Faraday mirror 118, while the optical fiber 128 connects the optical coupler 114 to the Faraday mirror 116. The optical coupler 114 and the optical fibers 122, 124, 126, and 128 are single mode (SM) components. The length of the optical fiber 128 differs from the length of the optical fiber 124 by the distance $\Delta L_R$ that introduces delay into the reference interferometer 106 and defines its free spectral range (FSR).

In operation, the tunable laser source 112 continuously generates an optical signal in a sweeping range of frequencies. As an example, the tunable laser source 112 may frequency sweep over an approximately 140 nm wavelength range starting from a wavelength of 1470 nm or 1510 nm wavelength. The optical signal generated by the tunable laser source 112 is transmitted to the optical coupler 114 through the optical fiber 122. The optical coupler 114 then divides the optical signal into two optical signals so that the divided optical signals are transmitted to the Faraday mirrors 116 and 118 through the optical fibers 128 and 124, respectively. The optical signal transmitted through the optical fiber 128 is reflected back to the optical coupler 114 by the Faraday mirror 116 at the end of the optical fiber 128. Similarly, the optical signal transmitted through the optical fiber 124 is reflected back to the optical coupler 114 by the Faraday mirror 118 at the end of the optical fiber 124. The Faraday mirrors 116 and 118 reflect light in respective substantially orthogonal polarization states, thereby ensuring that the returning optical signals have nearly the same polarization state.

Due to the extra distance traveled by the optical signal in the optical fiber 128, the frequency of the returning optical signal in the optical fiber 128 differs from the frequency of the returning optical signal in the optical fiber 124 at a given moment in time. As illustrated in FIG. 1, the frequency of the returning optical signal in the optical fiber 124 is denoted by $v_1$, and the frequency of the returning optical signal in the optical fiber 128 is denoted by $v_2$. Assuming the tunable laser source 112 sweeps the predefined range of frequencies at the rate $\gamma$, the optical frequencies $v_1$ and $v_2$ may be expressed as:

$$v_1 = \gamma t + v_0$$

$$v_2 = \gamma t - \gamma \tau + v_0,$$

where $v_o$ is the initial optical frequency of the tunable laser source, and $\tau$ is the round trip delay in the length $\Delta L_R$ of the optical fiber 128. The round trip delay $\tau$ is defined as:

$$\tau = \frac{2n\Delta L_R}{c},$$

where n is the refractive index of the optical fiber 128 and c is the speed of light in a vacuum. Assuming the constant sweep rate, $\gamma$, the frequency difference between the returning optical signals in the optical fibers 124 and 128 is:

$$\Delta v = \gamma \tau$$

The reference interferometer 106 is assumed to be non-dispersive, i.e., $\tau$ does not depend on the optical frequency of the optical signals. Alternatively, the reference interferometer 106 may be dispersion compensated. The phase difference between the two reflected signals may then be expressed as:

$$\Theta = 2\pi \Delta v t + \Theta_0 = 2\pi \gamma \tau t + \Theta_0,$$

where $2\pi\Delta v$ is the angular frequency difference.

The returning optical signals in the optical fibers 124 and 128 are combined at the optical coupler 114 and transmitted to the reference detector 120 through the optical fiber 126. When combined, the optical signal returning from the optical fiber 124 interferes with the optical signal returning from the optical fiber 128. The intensity of the interfering optical signals observed at the reference detector may be expressed as:

$$I = I_o + I_0 \cos(2\pi\gamma\tau t + \Theta_0)$$

with the assumption that the polarization state of the returning optical signals is the same. The term $I_0 \cos(2\pi\gamma\tau t+\Theta_0)$ defines the heterodyne beat signal produced by the returning optical signals. At the reference detector 120, the heterodyne beat signal is AC coupled by removing the DC component of the signal. The AC coupled heterodyne beat signal is transmitted to the processing unit 110 for signal processing (i.e., determining group delay of the optical DUT 104).

The test interferometer 108 of the optical network analyzer 102 includes the continuously tunable laser source 112, an optical coupler 130, a mirror 132, the optical DUT 104, and a DUT detector 134. Similar to the reference interferometer 106, the components of the test interferometer 108 are connected to each other by optical fibers 136, 138, 140 and 142. The optical fiber 140 connects the tunable laser source 112 to the optical coupler 130, while the optical fiber 136 connects the DUT detector 134 to the optical coupler 130. Similarly, the optical fiber 142 connects the optical coupler 130 to the mirror 132 that may be a gold mirror, while the optical fiber 138 connects the optical coupler to the optical DUT 104. An additional polarization controller may be used in one of the arms to match the polarization states of the returning optical signals. The optical coupler 130 and the optical fibers 136, 138, 140 and 142 are also single mode (SM) components. The length of the optical fiber 138 differs from the length of the optical fiber 142 by the distance $\Delta L_D$ that introduces delay into the test interferometer 108 and defines its free spectral range.

The operation of the test interferometer 108 is similar to the operation of the reference interferometer 106. However, the round trip delay $\tau_T$ for the test interferometer 108 is dependent on the frequency of the optical signal from the tunable laser source 112 due to the dispersion within the optical DUT 104, or expressed mathematically, $\tau_T = \tau_T(v)$. In addition, the amplitude of the heterodyne beat signal depends on transmission or reflection properties of the DUT. The amplitude and phase response of the optical DUT 104 may be derived by measuring changes in phase and amplitude of the heterodyne beat signal observed at the DUT detector 134.

The phase of the heterodyne beat signal of the test interferometer 108 is modified by the sweep non-uniformity of the tunable laser source 112. That is, the fact that the tunable laser source sweeps frequencies in a non-uniform manner with respect to time introduces additional phase shift into the phase of the heterodyne beat signal detected at the DUT detector 134 of the test interferometer 108. The same phenomenon exists for the reference interferometer 106. Therefore, both interferometers contain information about the non-uniform frequency sweep of the tunable laser source 112. The effect of the non-uniform frequency sweep by the tunable laser source is described below with reference to FIGS. 2–6.

Figure 2:
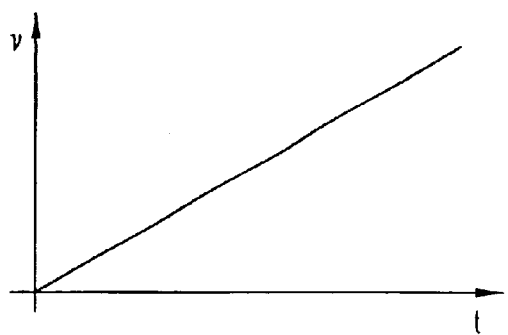
FIG. 2 illustrates the frequency sweep of an ideal continuously tunable laser source with respect to time.
Figure 3:
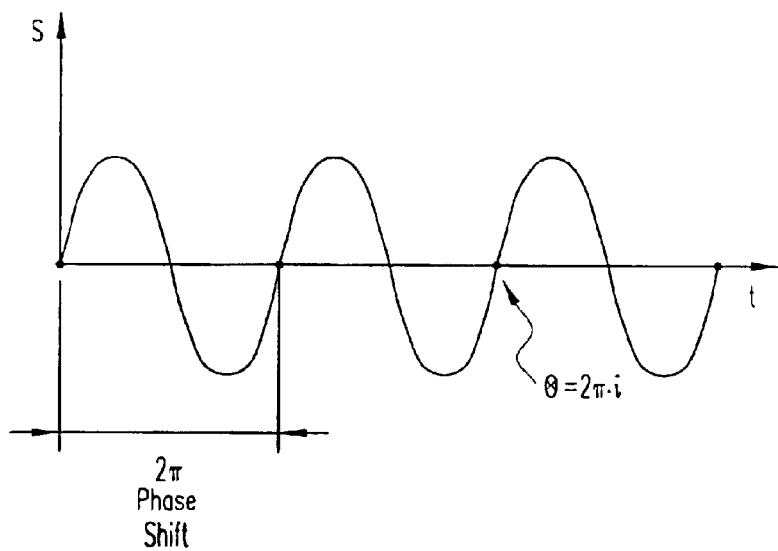
FIG. 3 illustrates the AC coupled heterodyne beat signal when an ideal continuously tunable laser source is used.
Figure 4:
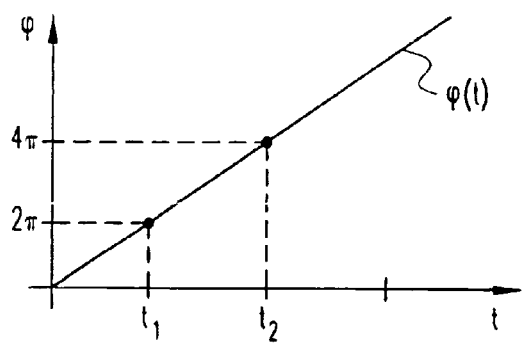
FIG. 4 illustrates a phase function of the heterodyne beat signal of FIG. 3.

Assuming that the tunable laser source 112 is an ideal tunable laser source that continuously sweeps the predefined range of frequencies (e.g., optical C- and L-bands) uniformly with respect to time, the change of frequency with respect to time for the optical signals generated by the laser source is linear, as illustrated in FIG. 2. Consequently, if the device under test has no dispersion, then the resulting AC coupled heterodyne beat signal is a pure sine wave of constant frequency as shown in FIG. 3. The phase, $\phi(t)$, of the heterodyne beat signal is linear as illustrated in FIG. 4.

Figure 5:
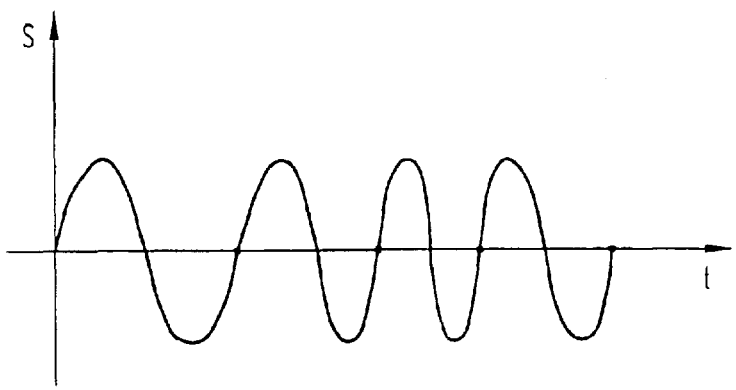
FIG. 5 illustrates the AC coupled heterodyne beat signal when a continuously tunable laser source that sweeps frequencies non-uniformly with respect to time is used.
Figure 6:
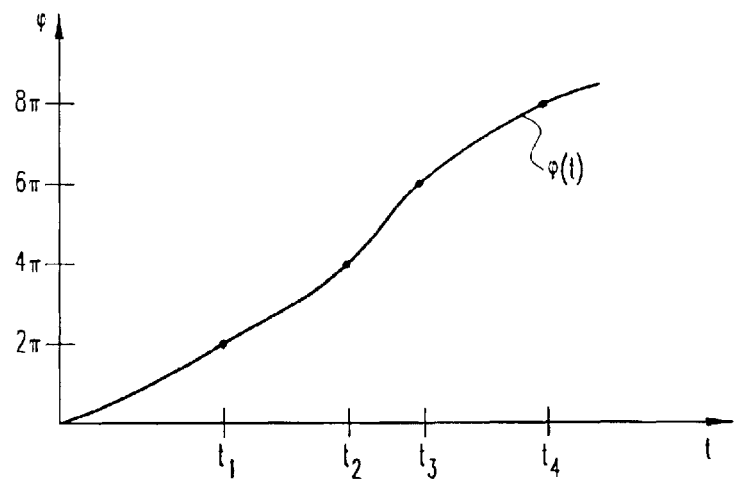
FIG. 6 illustrates a phase function of the heterodyne beat signal of FIG. 5.

However, for the tunable laser source 112 that sweeps frequencies non-uniformly, the frequency of the frequency of the heterodyne beat frequency varies, as illustrated in FIG. 5. Consequently, the phase $\phi(t)$ is non-linear, as illustrated in FIG. 6. Therefore, changes in phase of the heterodyne beat signal at the DUT detector 134 and at the reference detector 120 are strongly influenced by the sweep non-uniformity of the tunable laser source. The phase changes due to the dispersive characteristics of the optical DUT 104 observed at the DUT detector 134 are indistinguishable from and dominated by phase changes induced by the sweep non-uniformity of the tunable laser source 112.

The optical network analyzer 102 resolves the problem of phase changes being generated by the non-uniform sweep frequency of the tunable laser source 112 by determining phase of the heterodyne beat signal from the reference interferometer 106 to effectively "compensate" for the non-uniformity of the sweep of the tunable laser source 112. This compensation leads to the recovery of the true linear optical frequency scale as performed in classical network analyzers. The quality of the optical network analyzer depends on the precision of the recovered amplitude and phase of the heterodyne beat signal s(t).

Four exemplary orthogonal filter embodiments are provided for computing amplitude and phase of the heterodyne beat signals s(t) from the reference and test interferometers 106 and 108. The four embodiments of the orthogonal filters include: (i) in-phase and quadrature filtering in the time domain utilizing convolution, (ii) in-phase and quadrature filtering in the frequency domain, (iii) single sided filtering, and (iv) all-pass filtering utilizing Hilbert transforms.

Figure 7:
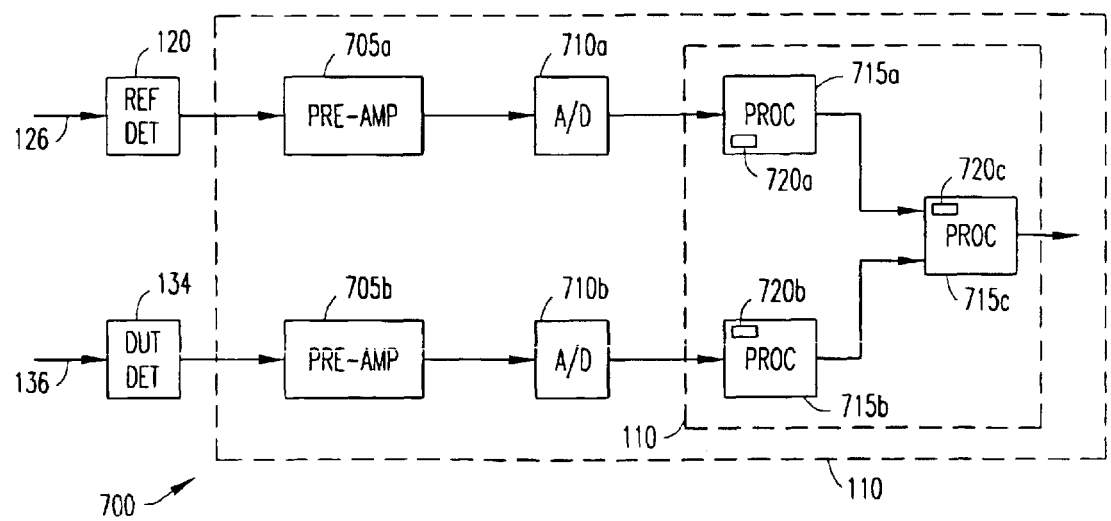
FIG. 7 is an exemplary block diagram for processing the optical signals measured by optical detectors according to FIG. 1.

FIG. 7 is an exemplary block diagram 700 for measuring and processing the heterodyne beat signals s(t) produced by the reference and test interferometers 106 and 108 of FIG. 1. The optical fibers 126 and 136 are optically coupled to reference 120 and DUT 134 detectors, respectively. The reference 120 and DUT 134 detectors are coupled to preamplifiers 705a and 705b. The preamplifiers are further coupled to analog-to-digital (A/D) converters 710a and 710b that are also coupled to the processing unit 110. The processing unit 110 may include a reference processor 715a to process data from the reference detector 120 and a test processor 715b to process data from the DUT detector 134.

Each of the processors 715a and 715b are coupled to a common processor 715c. The processors 715a, 715b, and 715c may be coupled to internal memory 720a, 720b, and 720c (cumulatively 720), respectively. Alternatively, the memory 720 may be external from the processors 715a–715c.

In operation, the reference and DUT detectors 120 and 134 receive optical signals from the reference and test interferometers 106 and 108 (not shown) and convert the optical signals into electrical signals. The electrical signals may represent heterodyne beat signals generated by the interferometers 106 and 108. The electrical signals are communicated to the processing unit 110 for processing the heterodyne beat signals and computing the transfer function and group delay of the optical DUT 104.

The preamplifiers 705a and 705b receive the electrical signals from the reference and DUT detectors 120 and 134, respectively. The preamplifiers 705a and 705b may be used to filter and/or scale the electrical signals. The A/D converters 710a and 710b convert the analog signals received from the preamplifiers 705a and 705b into digital signals. The digital signals are received from the A/D converters 710a and 710b by the processors 715a and 715b, respectively, to compute amplitude and phase of the heterodyne beat signals produced by the reference and test interferometers 106 and 108. The amplitude and phase signals may be computed by utilizing orthogonal filters, and are received by the common processor 715c that computes the transfer function and group delay of the optical DUT 104. It should be understood that the processing unit 110 may alternatively be a single processor for performing the computations. The processors 715a–715c may be general purpose processors or specialized processors, such as digital signal processors (SP). Alternatively, digital devices other than processors, such as a programmable logic gate array, may be utilized in the processing unit 110 to perform the computations. In another embodiment, rather than converting the analog signals to digital signals, the processing unit 110 may determine the transfer function and using analog components.

To further understand the heterodyne beat signals s(t) received from the interferometers 106 and 108 and how the heterodyne beat signals are utilized in processing the transfer function and of the optical DUT 104, the following description is provided. A frequency difference between the interfering optical waves giving rise to the heterodyne beat signal is $\Delta\nu = f_B = \gamma \tau_T$, where $\gamma$ is the optical frequency sweep rate and $\tau_T$ is the round trip delay of the test interferometer 108. For the reference interferometer 106, $\tau_R$ is independent of the optical frequency (i.e., $\tau_R(\nu) = \tau_R$ = constant). For the test interferometer 108, $\tau_T$ may change with the optical frequency produced by the tunable laser source 112 to provide information about dispersive properties of the optical DUT 104. In general, the sweep rate $\gamma$ is not constant (i.e., $\gamma = \gamma(t)$). Therefore, the heterodyne beat frequency changes with time and optical frequency. The heterodyne beat frequency may be computed as:

$$f_B = f_B(t, \nu) = \int_{t-\tau_T(\nu)}^{t} \gamma(\zeta) d\zeta$$

The reference and test interferometers 106 and 108 may be used to distinguish between the phase changes in the heterodyne beat frequency due to the non-uniform sweep of the tunable laser source 112 and dispersion of the optical DUT 104. The heterodyne beat signal measured by the test interferometer 108 varies not only in frequency, but also in amplitude as reflectance or transmittance of an optical DUT 104 changes with the optical frequency. Therefore, the signals measured have an oscillatory character with a modulated amplitude and frequency (phase). The precision with which the amplitude and the phase of the heterodyne beat signals is detected establishes performance of the optical component analyzer.

Figure 8:
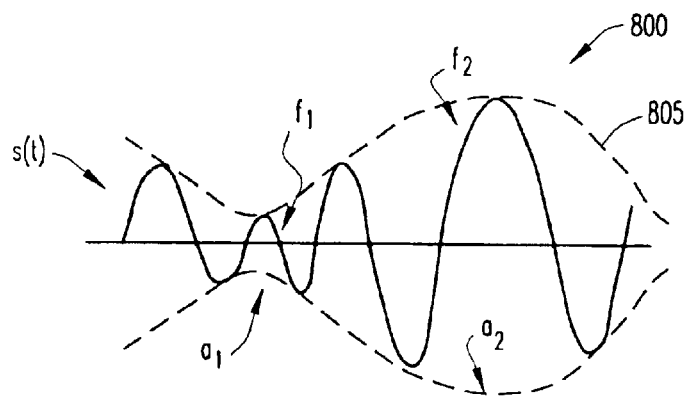
FIG. 8 illustrates a heterodyne beat signal as formed by the optical network analyzer of FIG. 1.

FIG. 8 illustrates an exemplary heterodyne beat signal s(t) 800 from the DUT interferometer with a varying amplitude and frequency. The varying amplitude, shown by envelope 805, has a minimum amplitude $a_1$ and a maximum amplitude $a_2$, where $a_1<a_2$. The varying frequency of the heterodyne beat signal s(t) has a maximum frequency $f_1$ and a minimum frequency $f_2$, where $f_1>f_2$.

Orthogonal filters may be used to measure the heterodyne beat signal s(t) of FIG. 8. In particular, orthogonal filters can be used to recover the amplitude and phase of the heterodyne beat signal s(t). A spectral component of a signal at a frequency $f_0$ can be determined by calculating a correlation of the signal at frequency $f_0$ with a signal periodically varying at the frequency $f_0$ (i.e., with $\cos(2\pi f_0 t)$). The spectral component may be computed as:

$$x_{f_0}(t) = \lim_{T\to\infty} \frac{1}{T} \int_{-T/2}^{T/2} s(t+\tau)\cos(2\pi f_0 \tau) d\tau$$

The broader spectrum of frequencies may be detected by selecting a periodically varying function that does not extend from $-\infty$ to $+\infty$, but rather is limited by an envelope, h(t), decaying to zero for final values of time.

Figure 9:
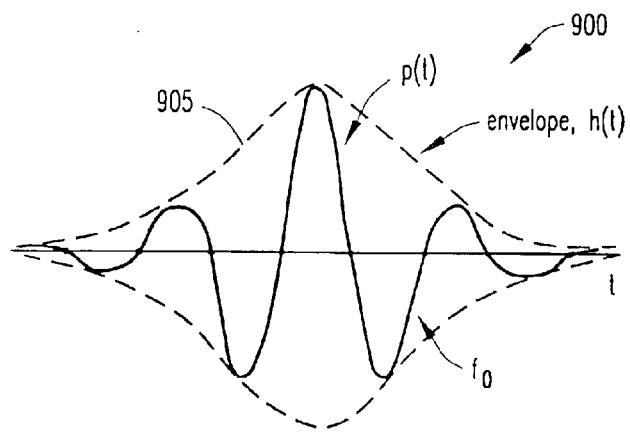
FIG. 9 illustrates a filter function for in-phase detection of amplitude and phase of the heterodyne beat signal of FIG. 8.
Figure 10:
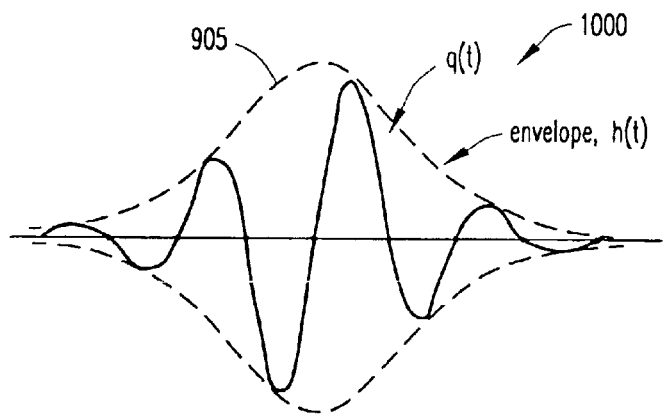
FIG. 10 illustrates a filter function for quadrature detection of amplitude and phase of the heterodyne beat signal of FIG. 8.

The first exemplary embodiment of the orthogonal filters includes in-phase and quadrature filters in the time domain as provided in FIGS. 9 and 10. FIG. 9 illustrates an in-phase filter for detecting a frequency band center around $f_0$. The function in FIG. 9 is described by $p(t)=h(t)\cos(2\pi f_0 t)$. The envelope 905 is described by a function h(t). Because correlation of the heterodyne beat signal with the function p(t) recovers the original heterodyne beat signal s(t) without changing its phase, the filter function p(t) describes the in-phase filter. The in-phase component of the heterodyne beat signal may therefore be computed by:

$$x(t) = \int_{-\infty}^{\infty} s(t+\tau)p(\tau)d\tau.$$

FIG. 10 illustrates a quadrature filter that may be used for the detection of a frequency band centered around $f_0$. The quadrature filter is defined in a similar manner as the in-phase filter. The phase shift of $\pi/2$ is realized by replacing the cosine function of the in-phase filter with a sine function. The envelope h(t) is the same as the envelope 905 of the in-phase filter, thereby maintaining the same spectral response of the in-phase filter 900. The equation $q(t)=h(t)\sin(2\pi f_0 t)$ describes the quadrature filter. Correlation of the heterodyne beat signal s(t) with the function q(t) shifts the phase of the heterodyne beat signal s(t) by $\pi/2$:

$$y(t) = \int_{-\infty}^{\infty} s(t+\tau)q(\tau)d\tau,$$

where y(t) is the quadrature component of the heterodyne beat signal s(t). Once the in-phase and quadrature components are known, then the amplitude and phase of the incoming signal can be calculated as:

$$r(t)=\sqrt{x^2(t)+y^2(t)} \text{ (amplitude)}$$

and $$\phi(t)=\arctan(y(t)/x(t)) \text{ (phase)}.$$

It is worth noting that for the selected in-phase p(t) and quadrature q(t) filters, correlation is the same as convolution with exception of the sign of q(t). Since sign is irrelevant in the instant process of determining the optical characteristics, either correlation or convolution may be utilized.

Figure 11:
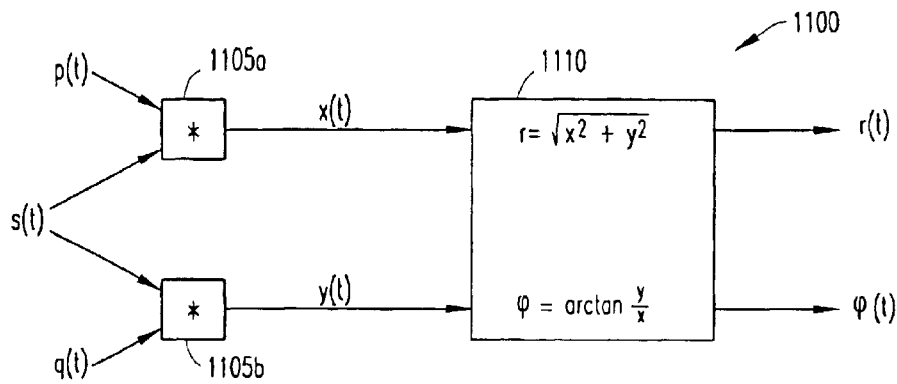
FIG. 11 is an exemplary block diagram for applying the filter functions to determine amplitude and phase of the heterodyne beat signal of FIG. 8 in the time domain.

FIG. 11 is an exemplary block diagram for computing amplitude and phase of the heterodyne beat signal s(t) in time domain. The in-phase filter p(t) is convolved with the heterodyne beat signal s(t) at 1105a to produce a time domain signal x(t), where the time domain signal is the in-phase component of the heterodyne beat signal. The quadrature filter q(t) is convolved with the heterodyne beat signal s(t) at 1105b to produce a time domain signal y(t), where y(t) is the quadrature component of the heterodyne beat signal s(t). The quadrature signals, x(t) and y(t), are utilized by function 1110 to produce the amplitude and phase of the heterodyne beat signal s(t).

In the time domain, the in-phase filter p(t) is mathematically represented as a product of the envelope function h(t) and $\cos(2\pi f_o t)$.

$$p(t)=h(t)\cos(2\pi f_o t)=h(t)\cos(\omega_o t),$$

where $\omega_0$ is the angular frequency. The above equation can be rewritten as:

$$p(t) = h(t)\frac{e^{-j\omega_0 t} + e^{j\omega_0 t}}{2}$$

The second exemplary embodiment of the orthogonal filters includes in-phase and quadrature filters in the frequency domain. Assume that the Fourier transform of h(t) is represented by H($\omega$), i.e., F[h(t)]=H($\omega$), then $$P(\omega) = F[p(t)] = F\left[\frac{1}{2}h(t)e^{-j\omega_0 t} + \frac{1}{2}h(t)e^{j\omega_0 t}\right]$$

$$= \frac{1}{2}H(\omega+\omega_0) + \frac{1}{2}H(\omega-\omega_0)$$

The function H($\omega-\omega_0$) represents a bandpass filter centered at the angular frequency $\omega_0$. The shape of the bandpass filter is uniquely defined by the envelope function h(t) in the time domain representation of the filter. It should be understood that the narrower the envelope h(t) is in the time domain, the wider the filter H($\omega$) is in the frequency domain. Because of this time-frequency relationship, the selection of the quickly decaying envelope h(t) in FIGS. 9–10 results in the wide passband in the frequency domain.

An analogous procedure is used to derive the quadrature filter Q($\omega$), wherein:

$$Q(\omega) = -\frac{1}{2}jH(\omega+\omega_o) + \frac{1}{2}jH(\omega-\omega_o).$$

The quadrature filter Q($\omega$) provides the same frequency response H($\omega-\omega_0$), however, the phase is shifted by $\pi/2$. Since in-phase filter p(t) is real and even, the Fourier transform P($\omega$) is also real and even. The quadrature filter q(t) is real and odd, therefore, the Fourier transform Q($\omega$) is odd and imaginary.

Figure 12A:
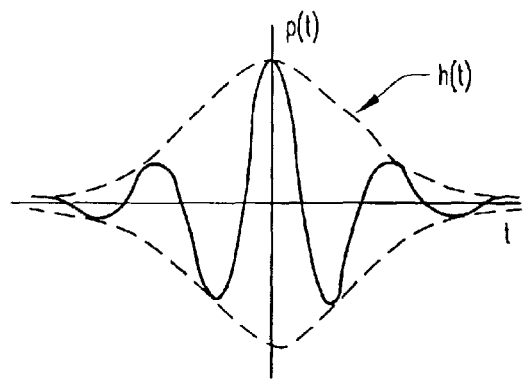
FIGS. 12A–12D illustrate orthogonal filters in the time and frequency domains as applied in FIG. 11.
Figure 12B:
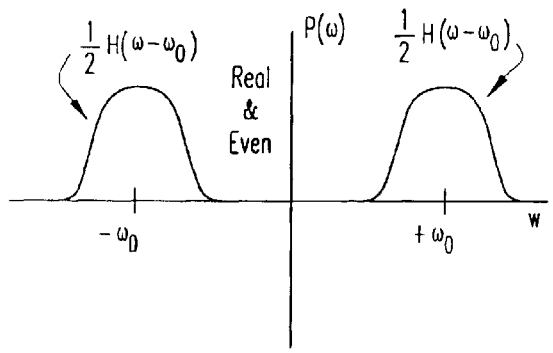
Figure 12C:
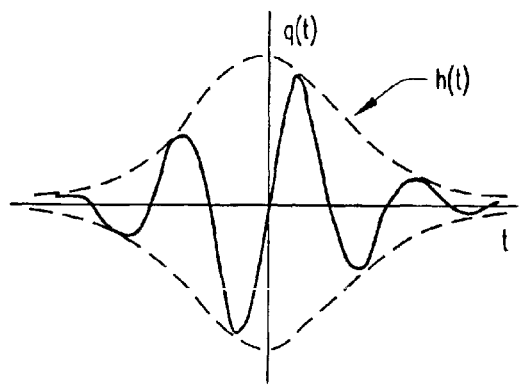
Figure 12D:
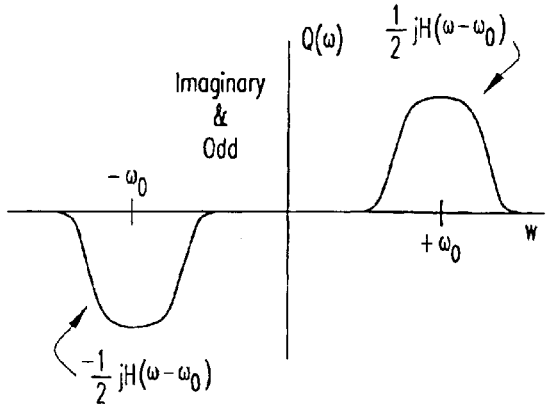

FIGS. 12A and 12B are the time and frequency domain representations of the in-phase filter in both the time and frequency domains, respectively. FIGS. 12C and 12D depict the quadrature filter in the time and frequency domains, respectively.

Figure 13:
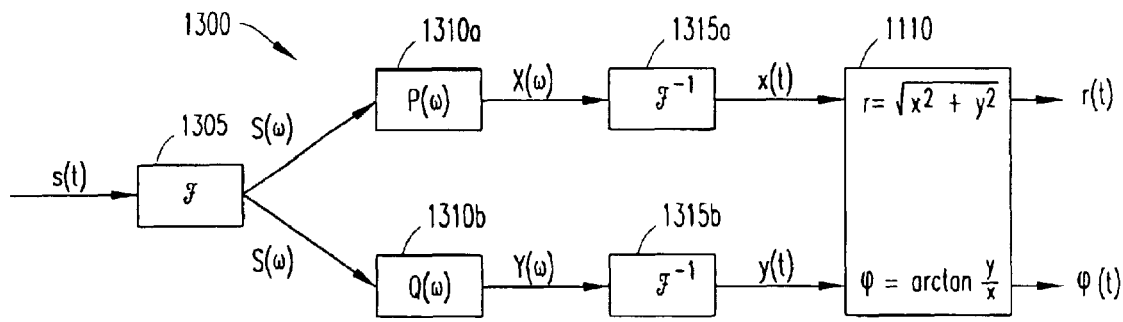
FIG. 13 is another exemplary block diagram for computing amplitude and phase of the heterodyne beat signal of FIG. 8 in the frequency domain.

When implementing the orthogonal filters in the frequency domain, the heterodyne beat signal s(t) is: (i) transformed to the frequency domain, (ii) filtered using P($\omega$) and Q(ω), and (iii) transformed back to the time domain. One reason for implementing the orthogonal filters in the frequency domain is that the computations in the frequency domain, which include addition and multiplication, is computationally faster and more efficient than computations in the time domain, which include convolution. The time-to-frequency and frequency-to-time conversions are performed because convolution may be performed as multiplication in the frequency domain. This process is illustrated in FIG. 13 in form of a block diagram 1300 and constitutes another exemplary embodiment for computing the amplitude and phase of the heterodyne beat signal s(t). The heterodyne beat signal s(t) is transformed by the Fourier transform 1305 into the frequency domain S(ω). The heterodyne beat signal S(ω) in the frequency domain is filtered by an in-phase filter P(ω) 1310a and a quadrature phase filter Q(ω) 1310b in order to generate signals X(ω) and Y(ω), respectively. The signals X(ω) and Y(ω) are transformed from the frequency domain back to the time domain via an inverse Fourier transform 1315a and 1315b. The time domain signals x(t) and y(t) resulting from the inverse Fourier transform operations are received by the function 1110. The function 1110 computes the time domain amplitude r(t) and phase φ(t) of the heterodyne beat signal s(t).

The third exemplary embodiment of the orthogonal filters includes single-sided filtering. The orthogonal filters may be represented by a transfer function T(ω) having real and imaginary parts defined by P(ω) and Q(ω), respectively. Mathematically, the transfer function T(ω) may be described as $$T(\omega)=P(\omega)-jQ(\omega).$$

Output z(t) of the single-sided filter, in response to the heterodyne beat signal s(t), is imaginary. The signal x(t) is the real part of the output z(t), while the signal y(t) is the imaginary part of z(t), where z(t) may be expressed as z(t)=x(t)−jy(t). The signals x(t) and y(t), are in quadrature (i.e., 90 degrees out of phase).

The output z(t) is an analytic signal with respect to x(t), and may be expressed as $$z(t)=r(t)\exp(j\phi(t)),$$

where the amplitude $r(t)=\sqrt{x^2(t)+y^2(t)}$ and the phase $$\varphi(t) = \arctan\frac{y(t)}{x(t)}.$$

Figure 14:
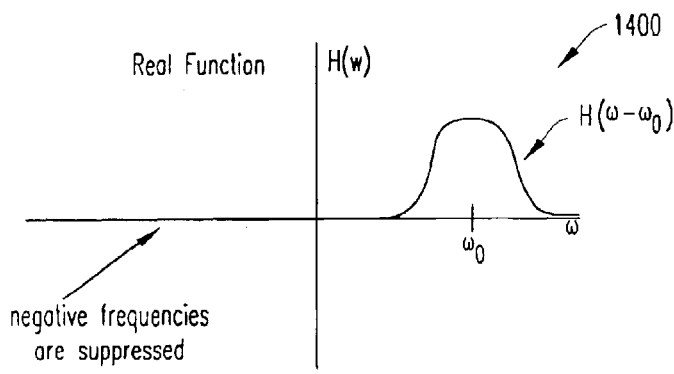
FIG. 14 illustrates a transfer function of a positive frequency bandpass filter centered at an angular frequency for computing amplitude and phase of the heterodyne beat signal of FIG. 8.

Typically, the sign of the phase φ(t) is irrelevant. The amplitude and phase of the heterodyne beat signal s(t) may be found as the absolute value of z(t) and the argument of z(t), expressed as r(t)=|z(t)| and φ(t)=arg(z(t)). By using expressions for P(ω) and Q(ω), the transfer function T(ω) may be expressed in terms of function H(ω). Therefore, the transfer function T(ω) is uniquely described by H(ω−ω_o) and, as before, represented as a band-pass filter being centered at the angular frequency ω_o. However, the transfer function or filter T(ω) operates on the positive frequencies only while the negative frequencies are suppressed (i.e., single-sided filtering). In the time domain, the function t(t) is complex with its real and imaginary parts being described by the in-phase p(t) and quadrature q(t) filters. The transfer function T(ω) is illustrated in FIG. 14.

Figure 15:
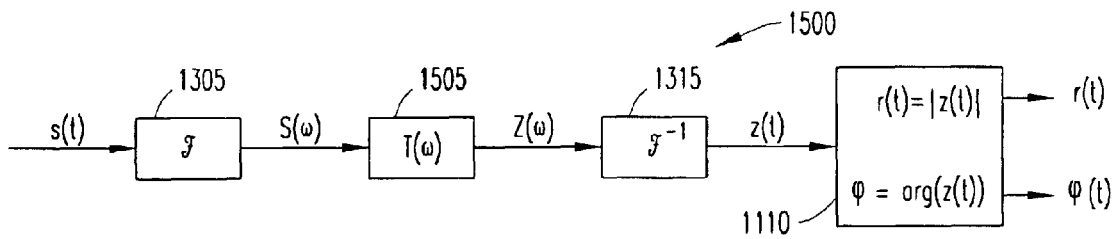
FIG. 15 is another exemplary block diagram for computing amplitude and phase of the heterodyne beat signal of FIG. 8 in frequency domain using the transfer function of FIG. 14.

FIG. 15 is another exemplary block diagram for computing the amplitude and phase of the heterodyne beat signal s(t). The heterodyne beat signal s(t) is transformed into the frequency domain, S(ω) by the Fourier transform 1305. The heterodyne beat signal S(ω) is received and filtered by a transfer function T(ω) 1505 to produce signal Z(ω). The signal Z(ω) is transformed to the time domain via the inverse Fourier transform 1315. The function 1110 produces the amplitude r(t) and phase φ(t) of the heterodyne beat signal s(t).

Figures 16A, 16B:
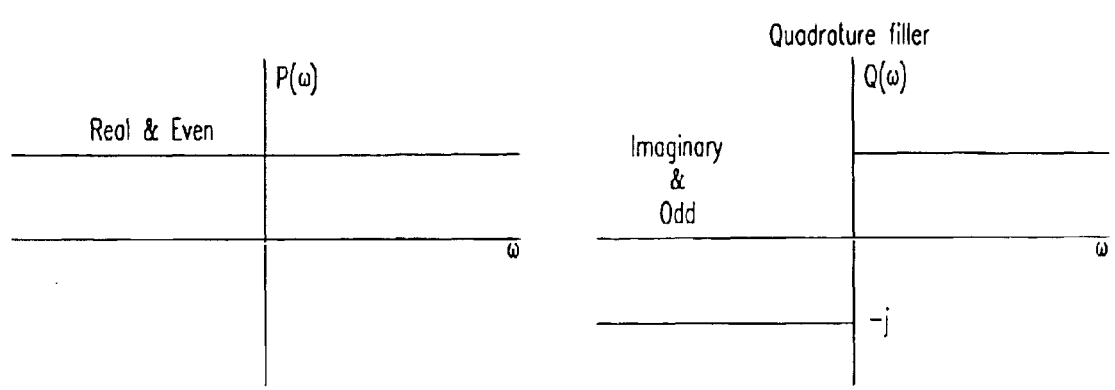
FIGS. 16A and 16B illustrate graphs of in-phase and quadrature filters, respectively, used in computing amplitude and phase of the heterodyne beat signal of FIG. 8, where

The fourth exemplary embodiment of the orthogonal filters includes performing all-pass filtering. The all-pass filters are a special case of orthogonal filters. The sweep rate of the tunable laser typically varies around some nominal sweep rate γ, resulting in the heterodyne beat frequency varying around γτ_T, where τ_T is a round trip delay of the test interferometer 108. Therefore, the natural selection of the filter type is a band-pass filter. However, an all-pass filter may also be considered. In implementing an all-pass filter, the quadrature filter q(t) may be implemented by a Hilbert transform. Shown in FIGS. 16A and 16B are all-pass orthogonal filters in the frequency domain, where the in-phase and quadrature filters are illustrated. As shown, the in-phase filter P(ω) is real and even. The quadrature filter Q(ω) is shown to be imaginary and odd. The exemplary block diagram for the all-pass orthogonal filters in the frequency domain is the same as that in FIG. 13. As before, the heterodyne beat signal s(t) remains unchanged after being processed by the in-phase filter. The phase of the heterodyne beat signal s(t) is shifted by π/2 for all frequencies by the quadrature filter Q(ω). The resulting signal y(t) may be found in the time domain by using the Hilbert transform:

$$y(t) = \frac{1}{\pi}\int_{-\infty}^{\infty}\frac{S(\alpha)}{t-\alpha}d\alpha.$$

Figure 17:
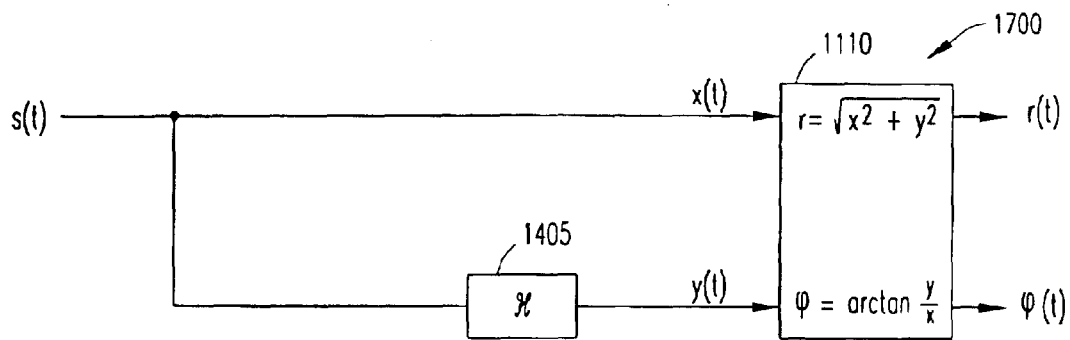
FIG. 17 is another exemplary block diagram for computing amplitude and phase of the heterodyne beat signal of FIG. 8 using the Hilbert transform of FIG. 16B.

FIG. 17 is another exemplary block diagram for computing the amplitude and phase of the heterodyne beat signal s(t) utilizing the Hilbert transform. As shown, the heterodyne beat signal is received directly by the function 1110 and via the Hilbert transform 1405. The Hilbert transform 1405 performs the quadrature filtering on the heterodyne beat signal s(t) so that the function 1110 may compute the amplitude and phase of the heterodyne beat signal s(t).

Figure 18:
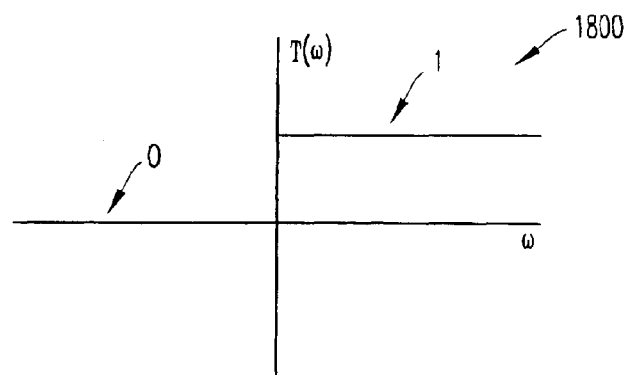
FIG. 18 illustrates a positive frequency, all-pass filter transfer function utilized in computing amplitude and phase of the heterodyne beat signal of FIG. 8.

The all-pass filter transfer function T(ω) takes a simple form. The all-pass filter suppresses the negative frequencies, while leaving the positive frequencies unchanged. This can be seen in FIG. 18 by the transfer function being shown as having zero for the negative frequencies and unity for the positive frequencies.

To this point, several methods for computing (i.e., recovering) the amplitude and phase of the heterodyne beat signal s(t) using the four exemplary embodiments of orthogonal filters have been shown, including (i) in-phase and quadrature filtering in the time domain utilizing convolution, (ii) in-phase and quadrature filtering in the frequency domain, (iii) single sided filtering, and (iv) all-pass filtering utilizing Hilbert transforms. Once the amplitude and phase information of the heterodyne beat signals are computed by utilizing orthogonal filters (of any form) from both interferometers 106 and 108, the optical characteristics of the device under test may then be computed. As shown in FIG. 1, both the reference and test interferometers 106 and 108 are used to generate amplitude and phase information. The generated amplitude and phase signals are: $r_R(t)$ (amplitude of the heterodyne beat signal from the reference interferometer 106), $\phi_R(t)$ (phase of the heterodyne beat signal from the reference interferometer 106), $r_T(t)$ (amplitude of the heterodyne beat signal from the test interferometer 108), and $\phi_T(t)$ (phase of the heterodyne beat signal from the test interferometer 108).

Since the reference interferometer 106 is non-dispersive or compensated for dispersion, the recovered phase is proportional to the optical frequency. Every $2\pi$ radians of phase change corresponds to the change in the optical frequency equal to the free spectral range (FSR) of the interferometer. Therefore, the function $\phi_R(t)$ provides a unique conversion between time and the optical frequency.

$$v(t) = \frac{\varphi_R(t)}{2\pi\tau_R},$$

where $v$ is the optical frequency, and $\tau_R$ is the delay in the reference interferometer 106.

Figure 19:
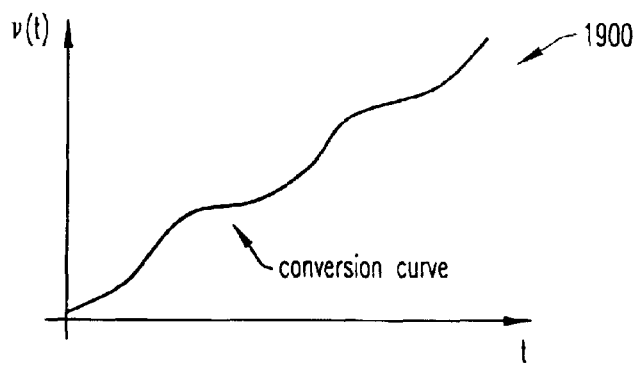
FIG. 19 illustrates a time-to-frequency conversion function.
Figure 20:
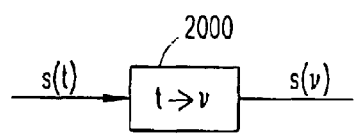
FIG. 20 is an exemplary block diagram depicting a simple conversion from the time to frequency domain.

FIG. 19 is an exemplary conversion curve or function 1900 for converting between time and the optical frequency. The conversion curve 1900 is non-uniform and describes the non-uniformity of the tunable laser source. FIG. 20 depicts a simple block diagram of a process 2000 for a conversion from the time to the optical frequency domain.

Conversion from the time to the optical frequency domain may be performed by a wavelength counting device. In particular, the conversion may be performed by the reference interferometer. The heterodyne beat signal s(t) from the reference interferometer 106 may also be used for clocking the acquisition of the heterodyne beat signal from the test interferometer 108. In this embodiment, the heterodyne beat signal from the test interferometer is sampled in equal optical frequency increments. Hence, the signals recovered by the orthogonal filters depend on the optical frequency $v$. The recovered signals $r(v)$, and $\phi(v)$ are the amplitude and phase, respectively, of the heterodyne beat signal from the test interferometer 106.

Three exemplary methods for determining optical characteristics of the device under test, including: (i) amplitude $r(v)$, (ii) phase $\Theta(v)$, and (iii) group delay $\tau_g(v)$, are shown that utilize the heterodyne beat signals s(t) produced by the reference and test interferometers 106 and 108. These methods include (i) phase subtraction, (ii) derivative ratio (i.e., division), and (iii) clocking.

Figure 21:
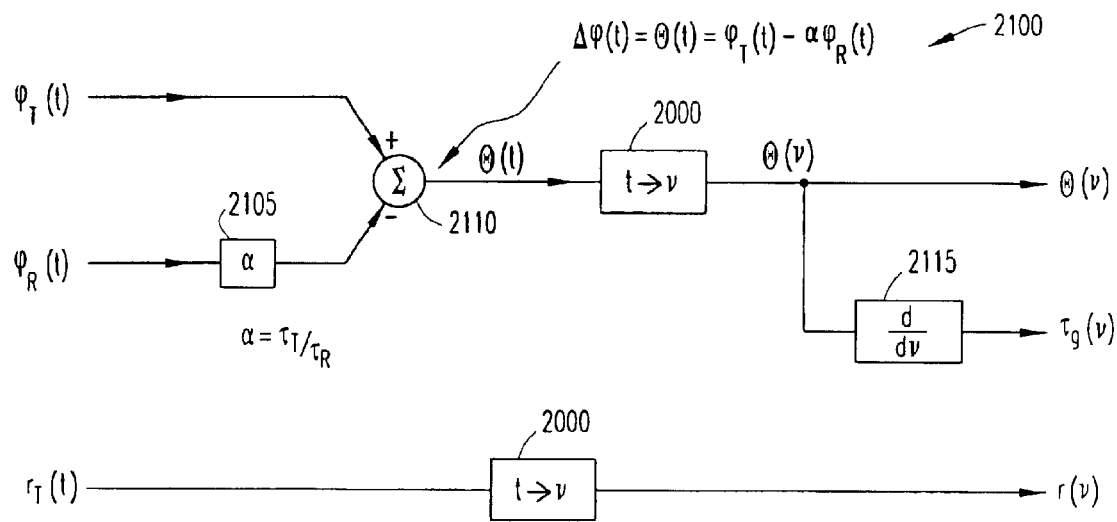
FIG. 21 is an exemplary block diagram for computing a transfer function and group delay of the optical DUT utilizing a phase subtraction method.

FIG. 21 shows an exemplary block diagram 2100 that utilizes the phase subtraction method for computing the group delay of the optical DUT 104. As shown, the phase $\phi_R(t)$ generated by the reference interferometer 106 is weighted by $\alpha=\tau_T/\tau_R$ and subtracted from the test phase $\phi_T$ generated by the test interferometer 108. The subtraction removes any sweep non-uniformity related to phase perturbations of the tunable laser source. Consequently, the phase $\Theta(t)$ substantially contains information about dispersion. The phase $\Theta(t)$ is converted to an optical frequency function $\Theta(v)$ and is then differentiated to find the group delay $\tau_g(v)$. The amplitude $r_T(t)$ is also converted to a function $r_T(v)$ in the optical frequency domain.

Figure 22:
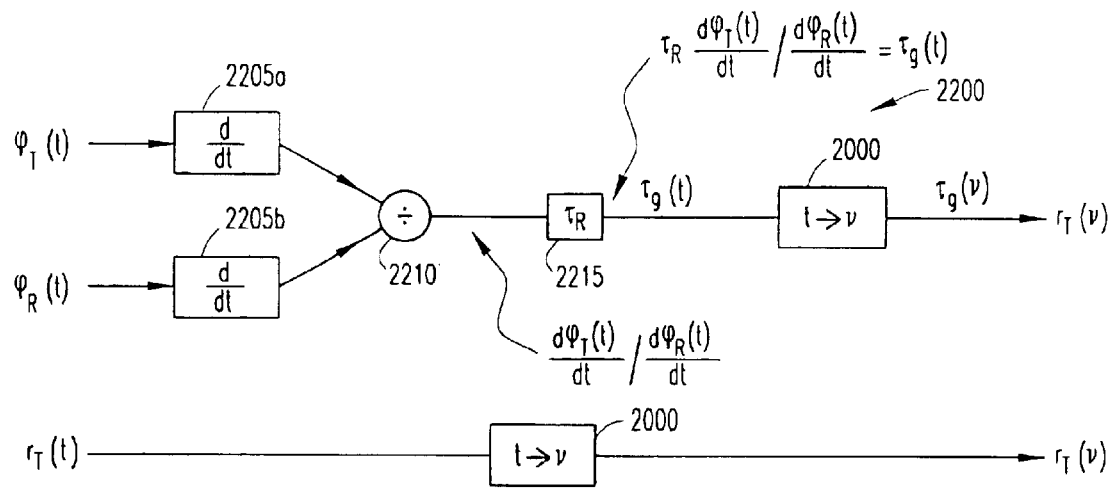
FIG. 22 is another exemplary block diagram for computing a transfer function and including group delay of the optical DUT utilizing a derivative ratio method.

FIG. 22 is an exemplary block diagram 2200 that utilizes the derivative ratio method for computing the group delay of the optical DUT 104. The phase functions $\phi_T(t)$ and $\phi_R(t)$ are differentiated by differentiators 2205a and 2205b, respectively, and divided by divider 2210. The process of division removes sweep non-uniformity related perturbations. The resulting function is equal to the group delay $\tau_g(t)$ after multiplication $\tau_R$. The group delay $\tau_g(t)$ and amplitude $r_T(t)$ are converted from the time to the optical frequency functions by the conversion function 2000.

Figure 23:
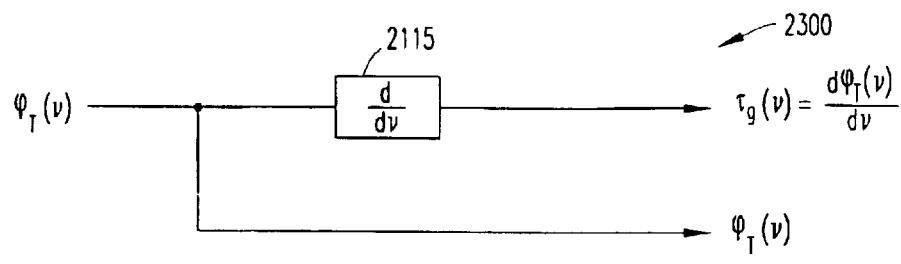
FIG. 23 is another exemplary block diagram for computing a transfer function and group delay of the optical DUT utilizing a clocking method.

FIG. 23 is an exemplary block diagram 2300 that utilizes the clocking method for computing the group delay $\tau_g(v)$ of the optical DUT 104. The heterodyne beat signal s(t) of the reference interferometer may be used to clock the acquisition of the heterodyne beat signal from the test interferometer 108. Such an implementation leads to the signal being sampled uniformly in the optical frequency domain, $v$. The orthogonal filters are used to recover the optical frequency functions $\phi_T(v)$ and $r_T(v)$. The group delay $\tau_g(v)$ is found by computing the derivative 2015, $$\frac{d\varphi_T(v)}{dv},$$

of the phase of the heterodyne beat signal from the test interferometer 108.

The previous description is of exemplary embodiments for implementing the principles of the present invention, and the scope of the invention should not necessarily be limited by this description. The scope of the present invention is instead defined by the following claims.

We claim:

1. A system for measuring optical characteristics of an optical device under test (DUT), said system comprising:
    a light source for generating an optical signal applied to the optical DUT;
    a reference interferometer and a test interferometer, said interferometers being optically coupled to said light source; and
    a computing unit coupled to said interferometers, said computing unit utilizing amplitude and phase computational components to aid in the determination of optical characteristics of the optical DUT;
    wherein the amplitude and phase computational components are orthogonal filters.

2. The system according to claim 1, wherein the optical characteristics include at least one of the following:
    a reflective transfer function,
    a transmissive transfer function, and
    group delay.

3. The system according to claim 1, wherein said light source is a tunable laser source.

4. The system according to claim 1, wherein the computing unit further computes an amplitude and a phase of a heterodyne beat signal produced by said test interferometer.

5. The system according to claim 1, wherein said reference interferometer is non-dispersive or dispersion compensated.

6. The system according to claim 1, wherein the computing unit includes orthogonal filters that are applied to a signal produced by at least one of the test or reference interferometers.

7. The system according to claim 6, wherein said computing unit includes:
    a first computing element for computing at least one of phase and amplitude of a heterodyne beat signal produced by said reference interferometer,
    a second computing element for computing at least one of phase and amplitude of a heterodyne beat signal produced by said test interferometer, and
    a third interferometer computing element for computing a group delay based on the phase computations of the first and the second computing elements.

8. The system according to claim 1, wherein the computing unit includes orthogonal filters, the orthogonal filters including:
    in-phase and quadrature filters in the time domain,
    in-phase and quadrature filters in the frequency domain,
    a single sided filter, and
    an all-pass filter using a Hilbert transform.

9. A method for measuring optical characteristics of an optical device under test (DUT), said method comprising:

generating a light signal;

transmitting the light signal on an optical test interferometer;

receiving a reference signal and a test optical signal, the reference optical signal being generated by test interferometer; and computing the optical characteristics of the optical DUT by utilizing at least one amplitude and phase computational component;

wherein the amplitude and phase computation component is a pair of orthogonal filters.

10. The method according to claim 9, wherein the optical characteristics include at least one of the following:

a reflective transfer function, a transmissive transfer function, and group delay.

11. The method according to claim 9, wherein the reference and test signals are heterodyne beat signals.

12. The method according to claim 9, wherein the light source is a tunable laser source.

13. The method according to claim 9, wherein said computing the optical characteristics further includes computing amplitude and phase of at least one heterodyne beat signal.

14. The method according to claim 9, wherein the reference interferometer signal is non-dispersive or compensated for dispersion.

15. A system for measuring optical characteristics of an optical component, said system comprising:

means for illuminating the optical component with an optical signal;

first means for determining an optical frequency of the optical signal generated by said means for illuminating;

second means for determining amplitude and phase of the optical signal generated by said means for illuminating and in response to illumination of the optical component, said second means including orthogonal filters; and means for computing optical characteristics of the optical component utilizing the phase of the optical signal generated by said means for illuminating and the amplitude and phase of the optical signal in response to illumination of the optical component.

16. A method for measuring optical characteristics of an optical device under test (DUT), comprising:

generating an input optical signal having a time-varying frequency;

illuminating the optical DUT with the input optical signal;

measuring a heterodyne beat signal generated in response to the optical DUT being illuminated by the input optical signal;

computing amplitude and phase of the heterodyne beat signal using orthogonal filters;

detecting a reference phase of the input optical signal; and computing the optical characteristics based on the amplitude and phase of the heterodyne beat signal and the reference phase of the input optical signal.

17. The method according to claim 16, wherein the response of the input optical signal from the optical DUT is at least one of a reflection or a transmission response.

18. The method according to claim 16, wherein the reference phase of the input optical signal is used to compute an optical frequency of the input optical signal.

19. The method according to claim 16, wherein the optical frequency is used to determine a true optical frequency scale.

20. The method according to claim 19, further comprising displaying the optical characteristics of the optical DUT on the true optical frequency scale.

21. The method according to claim 16, wherein the orthogonal filters are performed by at least one of the following:

an in-phase and quadrature filter in the time domain, an in-phase and quadrature filter in the frequency domain, a single sided filter, and an all-pass filter using a Hilbert transform.

22. The method according to claim 16, wherein the optical characteristics include at least one of the following:

a transmissive transfer function, a reflective transfer function, and group delay.

23. The method according to claim 22, wherein the computation of the group delay includes at least one of the following operations:

subtraction of the reference phase from the phase of the heterodyne beat signal, and division of the phase of the heterodyne signal by the reference phase.

24. A system for measuring optical characteristics of an optical device under test (DUT), comprising:

a light source that generates an input optical signal having a time-varying frequency;

a test interferometer optically coupled to said light source to receive the input optical signal, said test interferometer including the optical DUT;

a first optical detector optically coupled to said test interferometer to receive a heterodyne beat signal from said test interferometer; and a processing unit coupled to said optical detector, and configured to calculate the optical characteristics of the DUT utilizing orthogonal filters.

25. The system according to claim 24, further comprising an optical frequency counter coupled to said light source.

26. The system according to claim 25, wherein said optical frequency counter is a reference interferometer.

27. The system according to claim 26, further comprising a second optical detector optically coupled to said reference interferometer to receive a heterodyne beat signal from said reference interferometer.

* * * * *

UNITED STATES PATENT AND TRADEMARK OFFICE
CERTIFICATE OF CORRECTION

PATENT NO. : 6,914,681 B2
DATED : July 5, 2005
INVENTOR(S) : Szafraniec et al.

It is certified that error appears in the above-identified patent and that said Letters Patent is hereby corrected as shown below:

Title page,
Item [56], References Cited, OTHER PUBLICATIONS,
"Dyer, S. D. et al.," reference, delete "Interfereometric" and insert -- Interferometric --.

Column 14,
Lines 64 and 65, after "filters" insert -- that filter --.

Column 15,
Line 7, after "reference" insert -- optical --.
Line 8, after "by" delete "test" and insert -- a reference --.

Signed and Sealed this

Twenty-first Day of February, 2006

JON W. DUDAS
*Director of the United States Patent and Trademark Office*